United States Patent
Rutkowski et al.

(10) Patent No.: US 9,755,515 B2
(45) Date of Patent: Sep. 5, 2017

(54) SWITCHING REGULATOR CURRENT SENSING CIRCUITS AND METHODS

(71) Applicant: QUALCOMM Incorporated, San Diego, CA (US)

(72) Inventors: Joseph Rutkowski, Chandler, AZ (US); Yikai Wang, San Diego, CA (US); Jiwei Chen, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/818,209

(22) Filed: Aug. 4, 2015

(65) Prior Publication Data

US 2017/0040892 A1    Feb. 9, 2017

(51) Int. Cl.
    G05F 1/56      (2006.01)
    H02M 3/158    (2006.01)
    G05F 1/618    (2006.01)
    H02M 1/00      (2006.01)

(52) U.S. Cl.
    CPC ............ H02M 3/158 (2013.01); G05F 1/618 (2013.01); *H02M 2001/0009* (2013.01)

(58) Field of Classification Search
    CPC ....................... H02M 3/158; H02M 2001/0009
    USPC .......................................... 323/271–286, 351
    See application file for complete search history.

(56) References Cited

U.S. PATENT DOCUMENTS

| 7,800,352 | B2 | 9/2010 | Qiu et al. | |
|---|---|---|---|---|
| 8,102,164 | B2 * | 1/2012 | Colbeck | H02M 1/4225 323/271 |
| 8,653,757 | B2 | 2/2014 | Daniel | |
| 2007/0262761 | A1 * | 11/2007 | Ishigaki | H02M 3/156 323/282 |
| 2011/0121797 | A1 | 5/2011 | Daniel | |
| 2012/0153915 | A1 | 6/2012 | Loikkanen et al. | |
| 2013/0021009 | A1 * | 1/2013 | Waltman | H02M 3/156 323/271 |
| 2013/0193941 | A1 | 8/2013 | Defazio | |
| 2013/0314062 | A1 | 11/2013 | Notman et al. | |

(Continued)

OTHER PUBLICATIONS

International Search Report for PCT Application No. PCT/US2016/043008 Issued by the European International Searching Authority on Nov. 7, 2016; pp. 1-4.

(Continued)

*Primary Examiner* — Adolf Berhane
*Assistant Examiner* — Nusrat Quddus
(74) *Attorney, Agent, or Firm* — Haynes and Boone, LLP (36340)

(57) ABSTRACT

In one embodiment, a switching regulator includes an inductor, a first switch, and a second switch. The first and second switches generate current in the inductor. Inductor current may flow through the second switch with both a positive and negative polarity. Voltages on terminals of the second switch may be sensed, and an offset applied to generate a level shifted signal. In one embodiment, the switching regulator is a boost switching regulator, and the offset is generated using a current source. Matched MOS transistor switches may be used to couple voltages on terminals of the second switch to amplifier inputs, and the offset is introduced across an MOS switch coupled between one amplifier input and the output.

19 Claims, 8 Drawing Sheets

(56) References Cited

U.S. PATENT DOCUMENTS

| | | | | |
|---|---|---|---|---|
| 2013/0334884 A1* | 12/2013 | Arisawa | ............... | H02M 3/158 |
| | | | | 307/43 |
| 2014/0306680 A1 | 10/2014 | Liu et al. | | |
| 2015/0035510 A1* | 2/2015 | Hoshino | ............... | H02M 3/157 |
| | | | | 323/283 |
| 2015/0097537 A1* | 4/2015 | Koski | .................. | H02M 3/156 |
| | | | | 323/271 |

OTHER PUBLICATIONS

Written Opinion for PCT Application No. PCT/US2016/043008 Issued by the European International Searching Authority on Nov. 7, 2016; pp. 1-4.

* cited by examiner

SWITCHING REGULATOR CURRENT SENSING CIRCUITS AND METHODS

BACKGROUND

The present disclosure relates to electronic circuits, systems and apparatuses, and in particular, to switching regulator current sensing circuits and methods.

Switching regulators are a very efficient technique for providing and/or converting regulated voltages. Such regulators use one or more inductors and switches to store energy in magnetic fields generated as current flows through an inductor. Switches are used to selectively couple reference voltages to the inductor to either increase the energy in the inductor or allow the energy to flow to an output, for example. Accordingly, switching regulators are sometimes referred to as "switchers," "converters" (e.g., a Boost Converter or Buck Switcher).

FIG. 1 shows an example boost switching regulator. In a boost switching regulator, the input voltage is typically less than the output voltage. Buck regulators, on the other hand, have input voltages greater than the output voltages. A variety of switching regulators exist that store energy in inductors and transfer the energy using switches. In this example, a constant (or direct current, "DC") input voltage Vin is coupled to one terminal of an inductor L 101. The other terminal of the inductor 101 is coupled through a first switch 102 to a reference voltage (here, ground) and through a second switch 103 to an output terminal to produce a constant regulated output voltage Vout.

A boost switching regulator operates as follows. When switch 102 is closed (short circuited) and switch 103 is open (open circuited), the second terminal of inductor 101 is coupled to ground and a positive voltage Vout is applied across the terminals of inductor 101. Accordingly, during this first phase, denoted $\phi 1$, current in the inductor, IL, increases and energy is stored in the inductor. When switch 102 is opened and switch 103 is closed, the instantaneous inductor current remains unchanged, and such inductor current flows to the output terminal and into a load, which is represented here as a resistor Ro. During this second phase, denoted $\phi 2$, the voltage across the inductor reverses polarity because Vout is larger than Vin in a boost converter. Accordingly, inductor current IL decreases during this phase of operation. Switches 102 and 103 may turn on and off over a particular time period, or cycle, to alternately charge and discharge the energy in the inductor. In some applications, the time switch 103 is on (closed) and switch 102 is off (open) may cause the inductor current IL flowing from inductor 101 through switch 103 to ramp down from a positive value to a lower positive value before the end of a switching cycle. In some applications the cycle and reverse voltage (Vout−Vin) may cause the inductor current IL and the current flowing through switch 103 to change polarity and go from positive (i.e., flowing to the output) to negative (flowing from the output to the input).

The regulated output voltage Vout is controlled by a feedback loop implemented using control circuitry 104. In this example, control circuit 104 senses the output voltage Vout and inductor current IL to regulate the output voltage Vout by controlling the time switches 102 and 103 are turned on and off during each cycle.

One problem associated with switching regulators pertains to controlling the system using current (referred to as current control). As mentioned above, a boost switching regulator may have an inductor current that changes polarity during a switching cycle. Such changes in polarity cause problems for control circuits attempting to implement a current control scheme.

SUMMARY

The present disclosure pertains to switching regulator current sensing circuits and methods. In one embodiment, a switching regulator circuit comprises an inductor, a first switch having a first terminal and a second terminal, and a second switch having a first terminal and a second terminal. The first terminal of the first switch and the first terminal of the second switch form a switching node, and the inductor is coupled to the switching node. A control circuit controls the first switch and the second switch based on an output voltage and an inductor current. The control circuit comprises a current sense circuit coupled to the first terminal of the second switch and the second terminal of the second switch. The inductor current flows through the second switch and transitions from a positive polarity to a negative polarity over a cycle. The current sense circuit generates a level shifted signal representing the inductor current through the second switch, where the polarity of the level shifted signal is positive over the cycle of the inductor current through the second switch.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
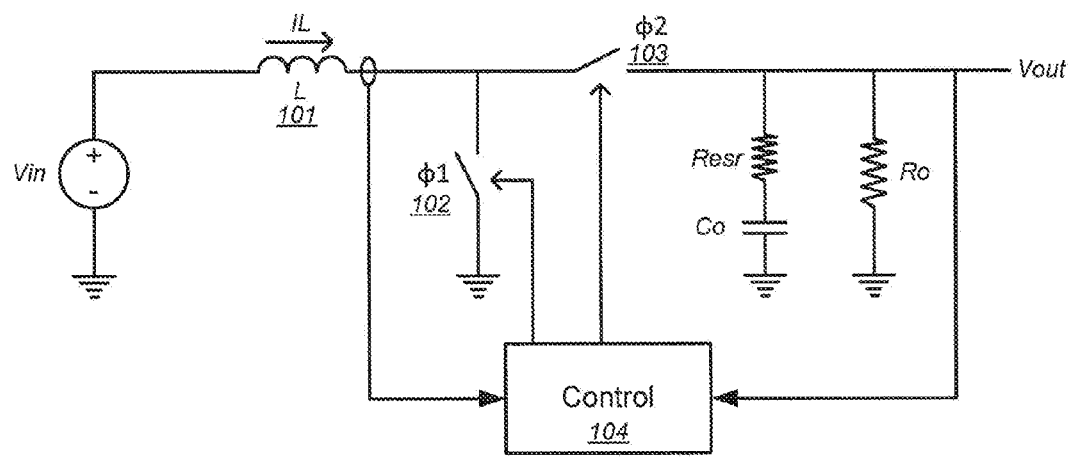
FIG. 1 illustrates a typical boost switching regulator.
Figure 2:
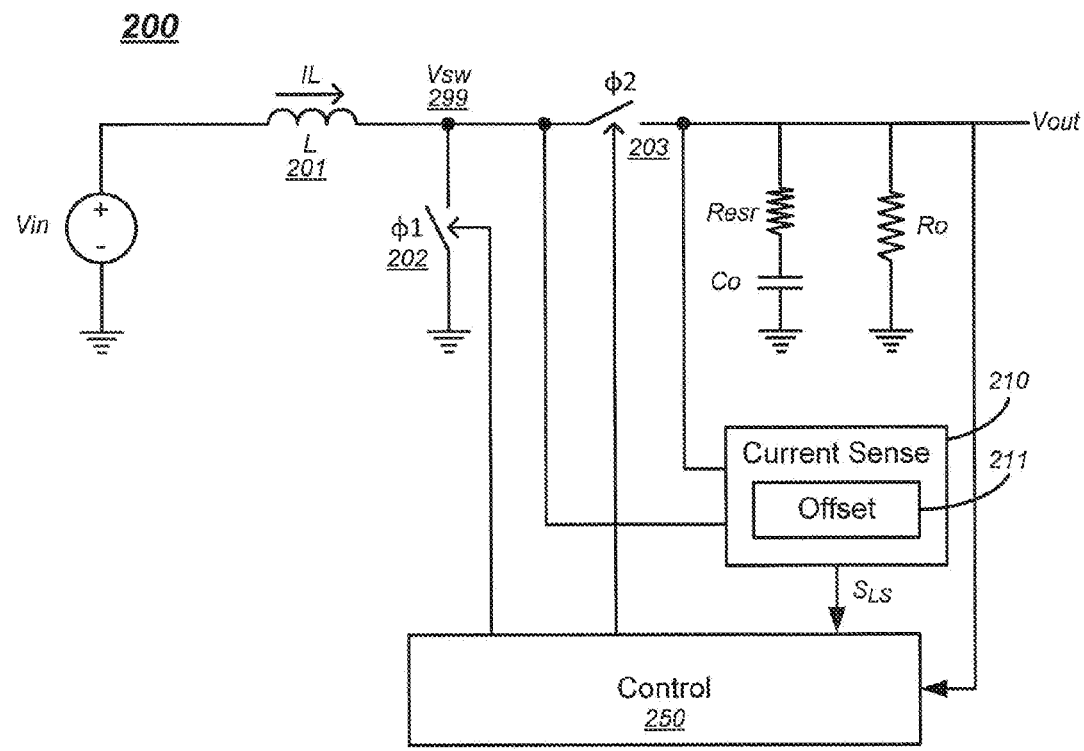
FIG. 2 illustrates an example switching regulator according to an embodiment.

FIG. 2 illustrates an example switching regulator according to an embodiment. The present example is described in the context of a boost switching regulator, but it is to be understood that other switching regulator topologies may employ some of the techniques described herein. In this example, a boost switching regulator circuit 200 includes an inductor 201, switch 202, switch 203, control circuit 250, and a current sense circuit 210. Inductor 201 has a first terminal configured to receive a first voltage (here, input voltage Vin) and a second terminal. Switch 202 has a first terminal coupled to the second terminal of inductor 201 at switching node 299 having a switching voltage Vsw and a second terminal coupled to a reference voltage, which in this case is ground (e.g., 0 volts). A second switch 203 has a first terminal coupled to the second terminal of inductor 201 at switching node 299 and a second terminal having a voltage, which in this case is the output voltage Vout. For a boost switching regulator shown in this example, Vout is typically greater than Vin. In a buck switching regulator, Vout is typically less than Vin, for example.

Switching circuit 200 further includes a control circuit 250 to control switch 202 and switch 203 based on a voltage and a current (e.g., output voltage Vout and inductor current IL). Accordingly, the output voltage Vout is sensed at an input of the control circuit 250 (e.g., via a resistor divider) to implement voltage control of the output voltage. Similarly, inductor current IL may be sensed across switch 203 when switch 203 is closed and switch 202 is open to implement current control (e.g., IL is approximately equal to the current through the switch). Voltage control typically operates over many cycles at a slower speed, whereas current control typically operates over each cycle at a higher speed.

Features and advantages of the present disclosure include a control circuit comprising a current sense circuit 210. Current sense circuit 210 is coupled to the first terminal of switch 203 and the second terminal switch 203. As mentioned above, a current through switch 203 may transition from a positive polarity to a negative polarity over a cycle. Advantageously, current sense circuit 210 may generate a level shifted signal, $S_{LS}$, representing the current through switch 203 when the switch is closed. In this example, the current through switch 203 is the inductor current IL. Thus, sensing the current through switch 203 is a technique for sensing inductor current. In this case, the inductor current ramps up when switch 202 is closed and switch 203 is opened, and the inductor current ramps down when switch 203 is closed and switch 202 is opened. Accordingly, sensing current through switch 203 as a current control parameter is sometimes referred to as "Valley Current Control." However, features and advantages of the present disclosure can track the decreasing current even when the current changes polarity (e.g., from positive to negative). In one embodiment, a polarity of the level shifted signal, $S_{LS}$, is positive over the cycle of the current through switch 203 even when the current through the switch changes polarity. Accordingly, the level shifted current, $S_{LS}$, may be used as a control parameter to overcome the problems of a polarity change over a cycle, for example. In one embodiment, the level shifted signal, $S_{LS}$, may represent the inductor current IL through switch 203 over approximately the entire time the second switch is closed over the cycle, for example.

As further illustrated in FIG. 2, in some embodiments current sense circuit 210 may include an offset circuit 211. For example, current sense circuit 210 may generate sensed voltages corresponding to voltages on the first and second terminals of switch 203. The voltage across switch 203 corresponds to current through the switch, which is substantially equal to the inductor current IL when switch 202 is open and switch 203 is closed. Accordingly, a difference between the sensed voltages on the terminals of switch 203 may correspond to the inductor current IL. In one embodiment, offset circuit 211 operates so that the difference between the sensed voltages remains positive when a difference between the voltages on the first and second terminals of switch 203 transitions from positive to negative (e.g., when the current changes polarity). While an example implementation of this technique is illustrated below, it is to be understood that a variety of circuits may be used to implement this feature.

Figure 3:
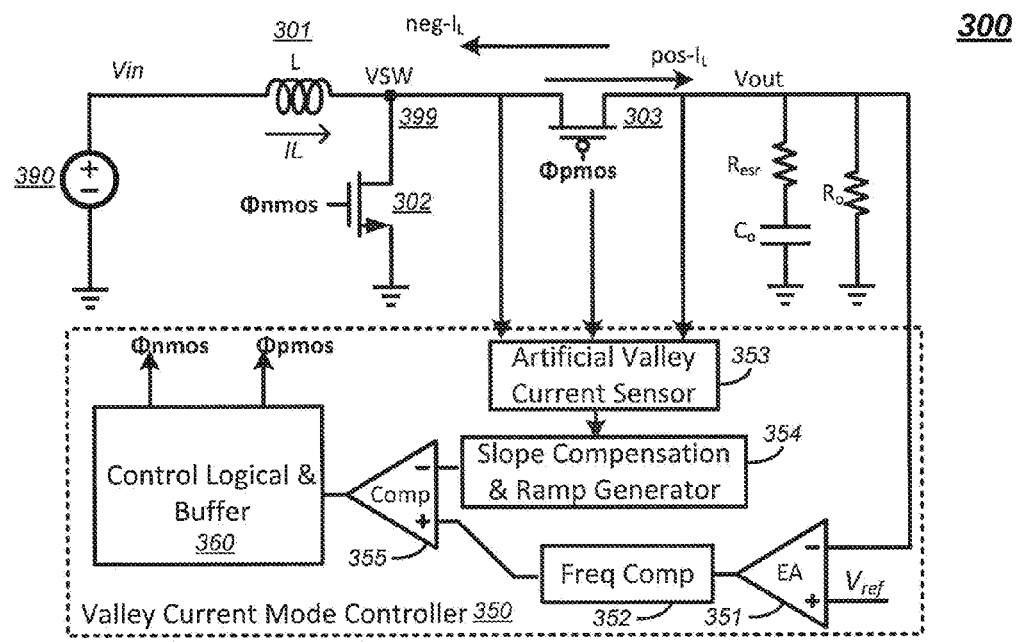
FIG. 3 illustrates a boost switching regulator with voltage and current control according to an embodiment.

FIG. 3 illustrates a boost switching regulator 300 with voltage and current control according to an embodiment. In this example, a voltage source 390 produces an input voltage Vin. Vin is coupled through an inductor L 301 to a switching node 399 having a voltage Vsw, for example. The switching node is coupled to ground through a first switch 302, which in this case is an NMOS transistor. The switching node is coupled to an output having a voltage Vout through a second switch 303, which in this case is a PMOS transistor. While NMOS and PMOS transistors are shown here as example implementation of the switches, it is to be understood that other transistor types could be used in other implementations. The first switch and second switches are opened and closed across a plurality of cycles. Additionally, during a particular cycle, when the first switch 302 is open (NMOS biased off), the second switch 303 is closed (PMOS biased on), and when switch 302 is closed (NMOS biased on), switch 303 is opened (PMOS biased off). The output terminal of the boost switching regulator 300 may be coupled to a load (modeled here by Ro) and output capacitor, which may have a capacitance Co and electro-static resistance Resr, for example.

Boost switching regulator 300 (or just "Boost regulator") includes a control circuit 350 (e.g., "Valley Current Mode Controller"), which implements both voltage control and current control. For example, output voltage Vout may be coupled to an input of an error amplifier (EA) 351 and compared to a reference voltage Vref. If Vout deviates from a nominal value set by Vref (e.g., due to current loading or unloading), EA 351 will produce a signal that may be used to correct for such deviations (e.g., reducing Vout if Vout increases or increasing Vout if Vout decreases). In addition to EA 351, a voltage control loop may include a frequency compensation network 352 that receives a voltage error signal from EA 351 and produces an output to comparator 355. A current control loop may include current sense circuit (or "current sensor") 353 and slope compensation and ramp generator 354 coupled to a second input of comparator 355. Comparator 355, in turn, generates a signal to control logic and buffers 360, which generate switch control signals Φnmos and Φpmos to turn switches 302 and 303 on and off. As mentioned above, current sensor 353 has a first input coupled to one terminal of switch 303 (here, PMOS 303) and a second input coupled to a second terminal of PMOS 303. Current sensor 353 may also receive the control signal Φpmos, which is also provided to the gate of PMOS 303 as described in more detail below.

Figure 4:
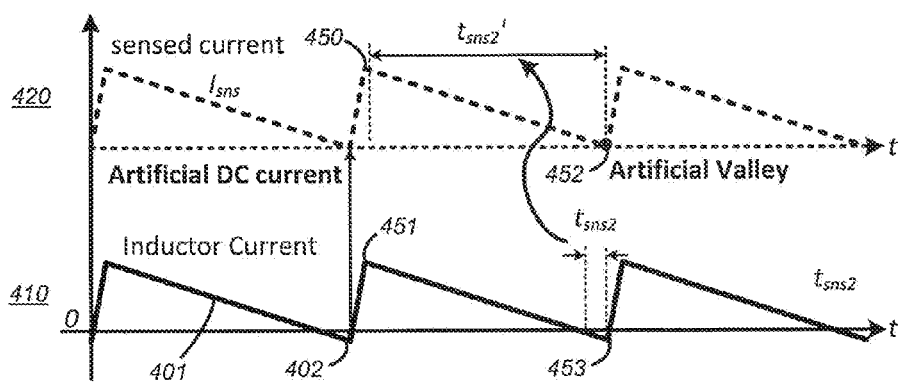
FIG. 4 illustrates an example of a level shifted signal according to an embodiment.

Features and advantages of the present disclosure include generating a level shifted signal (or "artificial valley") that maintains the same polarity when current through the switch (and voltage across the switch) changes polarity over a cycle, for example. As illustrated in FIG. 3, current IL from inductor 301 may flow through PMOS transistor 303 to the output. In this example, current flowing from the switching node to the output is referred to as positive current (pos-IL), and current flowing from the output to the switching node is referred to as negative current (neg-IL). FIG. 4 illustrates an example of a level shifted signal according to an embodiment. Inductor current IL is shown at 410. As shown in FIG.

4, the inductor current ramps up when NMOS transistor 302 is closed and PMOS transistor 303 is open, and the inductor current ramps down when PMOS transistor 303 is closed and NMOS transistor 302 is open. This process is repeated across multiple cycles. As illustrated at 410, when PMOS transistor is closed, the inductor current ramps down at 401 and changes from a positive polarity to a negative polarity at 402 for a time tsns2. The polarity change makes valley current control problematic. Advantageously, a level shifted signal is generated that has a positive polarity across the full cycle. In this example, a level shifted (or artificial) sensed current Isns is shown at 420. The level shifted sensed current has been shifted by an offset to a higher (or artificial) DC value so that the positive and negative ramps all have a common polarity (e.g., in this case, positive). In this example, the level shifted signal, here a current Isns, comprises a maximum positive value at 450 corresponding to a maximum positive inductor current at 451 and a minimum positive value at 452 corresponding to a maximum negative inductor current at 453. This allows the current control loop to track the negative ramp of the current for a full cycle to improve current control of the switching regulator.

Figure 5:
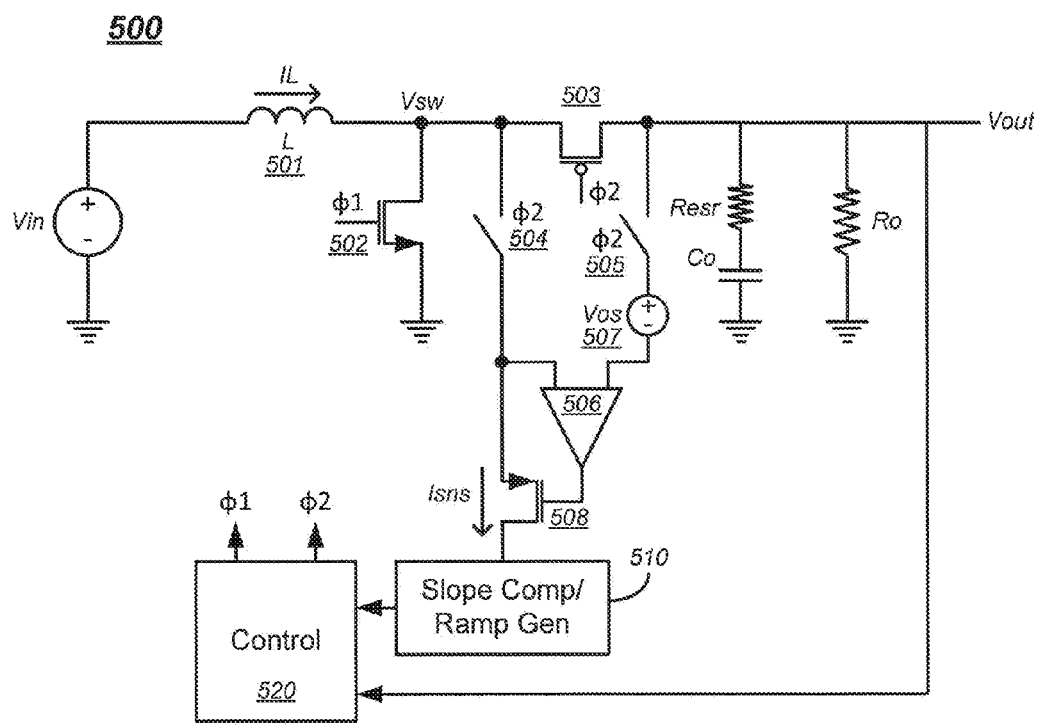
FIG. 5 illustrates an example boost switching regulator with current sensing according to an embodiment.

FIG. 5 illustrates an example boost switching regulator with current sensing according to an embodiment. Boost regulator 500 includes a PMOS switch 503 having a current that may transition between different polarities over a cycle. In this example, the terminals of the PMOS switch 503 are coupled to a current sense circuit using switches 504 and 505, which may be controlled to close at the same time PMOS switch 503 is closed (e.g., when φ2 goes low). In particular, switch 504 is coupled between a terminal of switch 503 and an input of the current sense circuit, and switch 505 is coupled between the other terminal of switch 503 and a second input of the current sense circuit. When switch 503 is closed, switch 502 is open and switches 504 and 505 are closed, thereby coupling the voltage from both sides of switch 503 to the current sense inputs.

FIG. 5 further illustrates another aspect of one example current sense circuit. In this example, a current sense circuit comprises a differential input amplifier 506 and a voltage offset 507. Amplifier 506 has a first input coupled to the first terminal of PMOS switch 503 through switch 504, and a second input coupled to the second terminal of PMOS switch 503 through switch 505 and voltage offset 507. Voltage offset circuit 507 produces an offset between second terminal of the PMOS switch 503 and the second input of amplifier 506. Accordingly, the voltages at the inputs of amplifier 506 is nominally different by the voltage drop across PMOS switch 503, which is the product of the inductor current IL and the on resistance between the drain and source of the PMOS transistor (i.e., IL*Rdson), and the voltage offset 507. In one embodiment, the current sense circuit further includes a transistor 508 having a control terminal coupled to an output of the amplifier 506, a first terminal coupled to the first input of the amplifier 506, and a second terminal to produce a current corresponding to the current through the PMOS switch 503. For example, transistor 508 configures amplifier 506 in a unity gain configuration and acts as a voltage to current converter with a current output. In this case, amplifier 506 and the feedback provided by transistor 508 work to cause the inputs of amplifier 506 to be approximately equal. To achieve this, transistor 508 pulls a current through switch 504 to produce a voltage drop across switch 504 equal to the voltage drop across PMOS switch 503 (i.e., IL*Rdson) and the voltage offset 507. If Rdson is known, the voltage offset is known, and the ON resistance of switch 504 is known (e.g., a ratio of Rdson of PMOS 503), then the current through transistor 508 is a sensed current, Isns, corresponding to the current through the PMOS switch 503 and inductor current IL. This sense current, Isns, may be coupled to slope compensation and ramp generator 510 as a current control input, which in turn is used by control circuit 520 to produce switch control signals φ1 and φ2.

Figure 6:
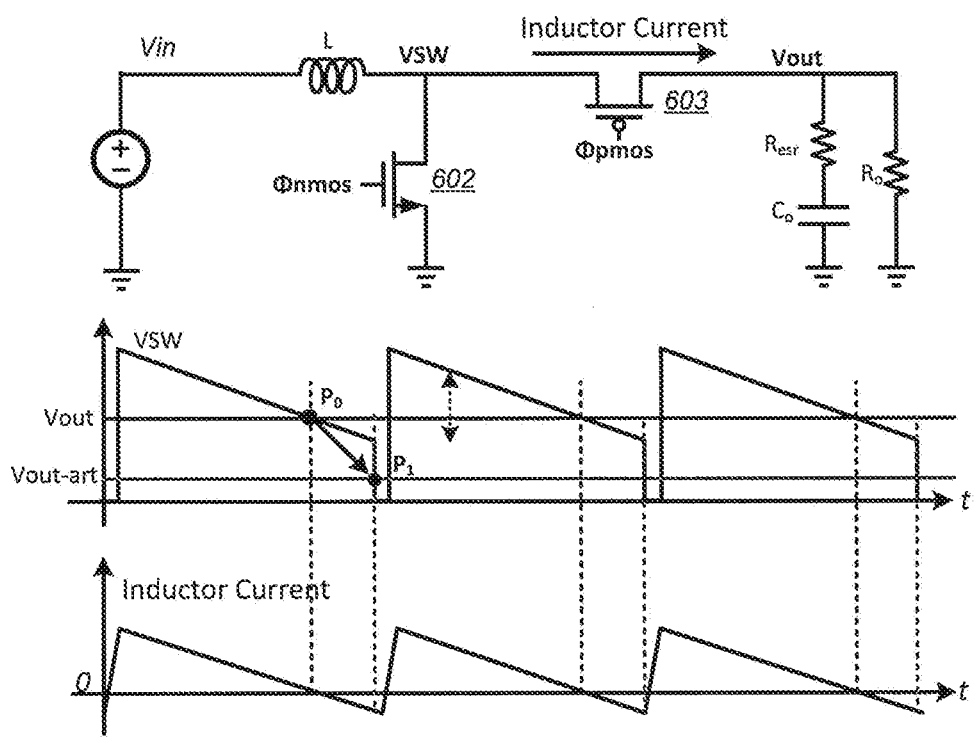
FIG. 6 illustrates another example of a level shifted signal according to an embodiment.

FIG. 6 illustrates another example of a level shifted signal according to an embodiment. As shown in this example, the inductor current of a boost regulator increases when the NMOS switch 602 is closed and PMOS switch 603 is opened, and the inductor current decreases when the PMOS switch 603 is closed and NMOS switch 602 is opened. FIG. 6 also illustrates the voltage on the switching node, VSW, VOUT, and VOUT minus a voltage offset (artificial Vout-art). A difference between VSW and VOUT corresponds to inductor current IL through the ON resistance of PMOS switch 603, Rdson. When NMOS switch 602 is closed and PMOS switch 603 is opened, no current flows through switch 603. However, when PMOS switch 603 is closed and NMOS switch 602 is opened, the voltage across PMOS switch 603 is VSW minus Vout. However, as illustrated in FIG. 4, VSW may drop below Vout, corresponding to a negative inductor current. FIG. 6 illustrates that a difference between VSW and Vout-art (i.e., a difference between the switching node voltage and the output voltage, Vout, minus a voltage offset, may be positive the entire time that the PMOS switch 603 is turned on during the cycle.

Figure 7:
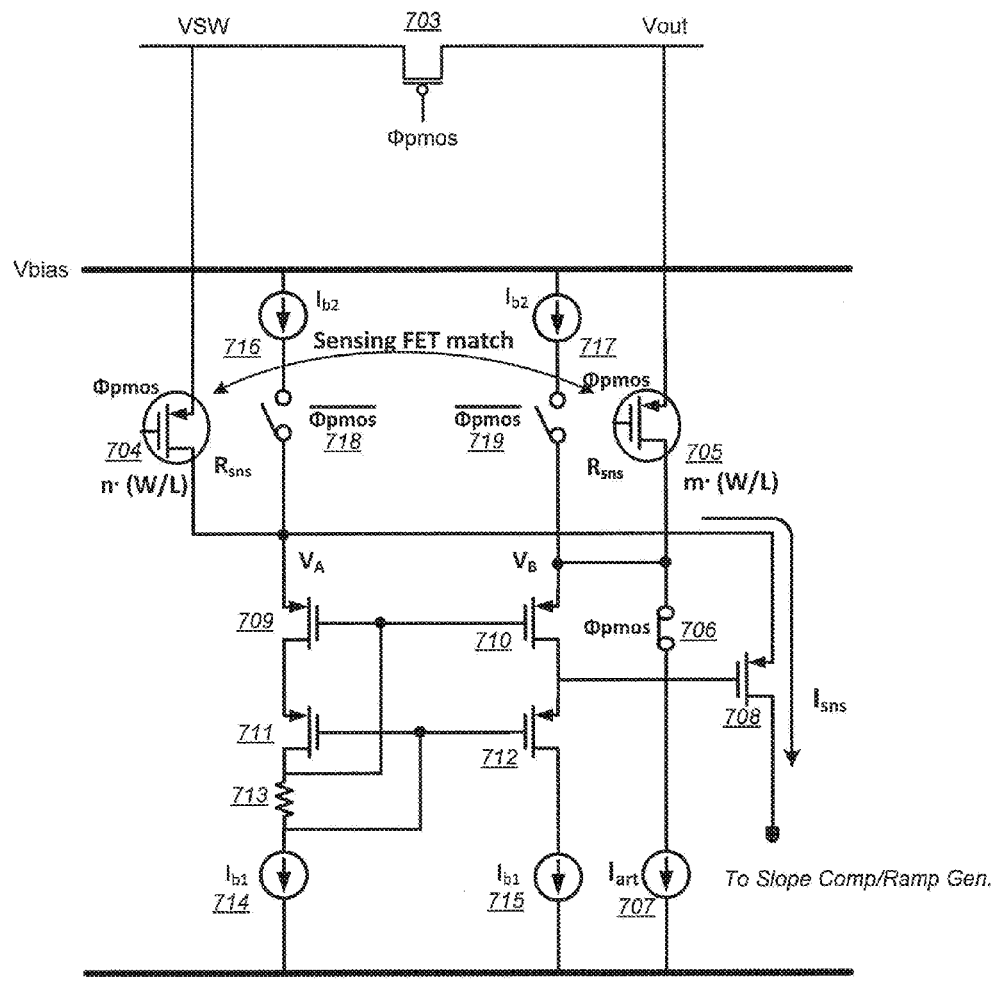
FIG. 7 illustrates an example implementation of current sensing according to an embodiment.

FIG. 7 illustrates an example implementation of current sensing according to an embodiment. In this example, terminals of a PMOS transistor output switch of a boost converter are coupled through PMOS switches 704 and 705 to inputs of a differential input common base amplifier comprising PMOS transistors 709-712, resistor 713, and bias current generators 714-717. Voltage VSW on a terminal of PMOS switch 703 is coupled through PMOS switch 704 to produce a voltage Va on a first input of the common base amplifier. Voltage Vout on the other terminal of PMOS switch 703 is coupled through PMOS switch 705 to produce a voltage Vb on a second input of the common base amplifier. In this example, PMOS devices 704 and 705 comprise drain to source ON resistances, Rsns, that are matched to each other. In this example, Rsns is a ratio of the size (e.g., width to length ratio, W/L) of PMOS switch 703 so that Rsns is related to Rdson of the PMOS switch. Accordingly, a voltage dropped across PMOS switch 703 caused by inductor current and Rdson is related to the voltage dropped across PMOS switch 704 caused by a sense current Isns as well as an offset voltage generated by a current as described below.

When PMOS switch 703 is on (closed), inductor current IL flows between the terminals of PMOS switch 703 generating a voltage (VSW−Vout=IL*Rdson). VSW is coupled through PMOS switch 704, which is also on (closed), to one input of common gate amplifier at the source of transistor 709 to produce a voltage Va. Vout is coupled through PMOS switch 705, which is also on (closed), to the other input of common gate amplifier at the source of transistor 710 produce a voltage Vb. In this example, a voltage offset is implemented by a current source (Iart) 707 coupled between the drain of PMOS 705 and input of common gate amplifier at the source of transistor 710. Iart is activated by switch 706, which is closed when PMOS switch 703 is closed. Accordingly, Iart pulls a current through PMOS switch 710 so that the voltage on Vb is Vout minus the product of Iart and the drain to source on resistance of PMOS 710 (Vb=Vout−Iart*Rsns). Thus, Iart increases the voltage drop across PMOS switch 710. Transistor 708 is arranged as described in FIG. 5 to produce a unity gain feedback around the common gate amplifier from an output to Va. Accordingly, the circuit will operate to set Va equal to Vb. The result is a sense current, Isns, through PMOS transistor 708 as follows: Isns=[(VSW−Vout)/Rsns]+Iart.

In some applications it may be desirable to turn a current sense circuit off to save power, and then turn the current sense circuit on very quickly to sense the current through a switch. In this example, the differential common base amplifier is biased by current sources 716 and 717 only when PMOS switch 703 is off. For example, switch 718 is configured in series with current source 716, which is coupled between a first input of the amplifier and a reference voltage, here Vbias. Similarly, switch 719 is configured in series with current source 717, which is coupled between a second input of the amplifier and Vbias. Switches 718-719 are open when switch 703 is closed, and switches 718-719 are closed when switch 703 is opened to maintain a bias on the amplifier input when switch 703 is opened. Thus, when switch 703 is closed, the current sense circuit is active and current through switch 703 may be sensed very quickly, and when switch 703 is open, the current sense circuit consumes a small nominal bias current to save power.

Figure 8:
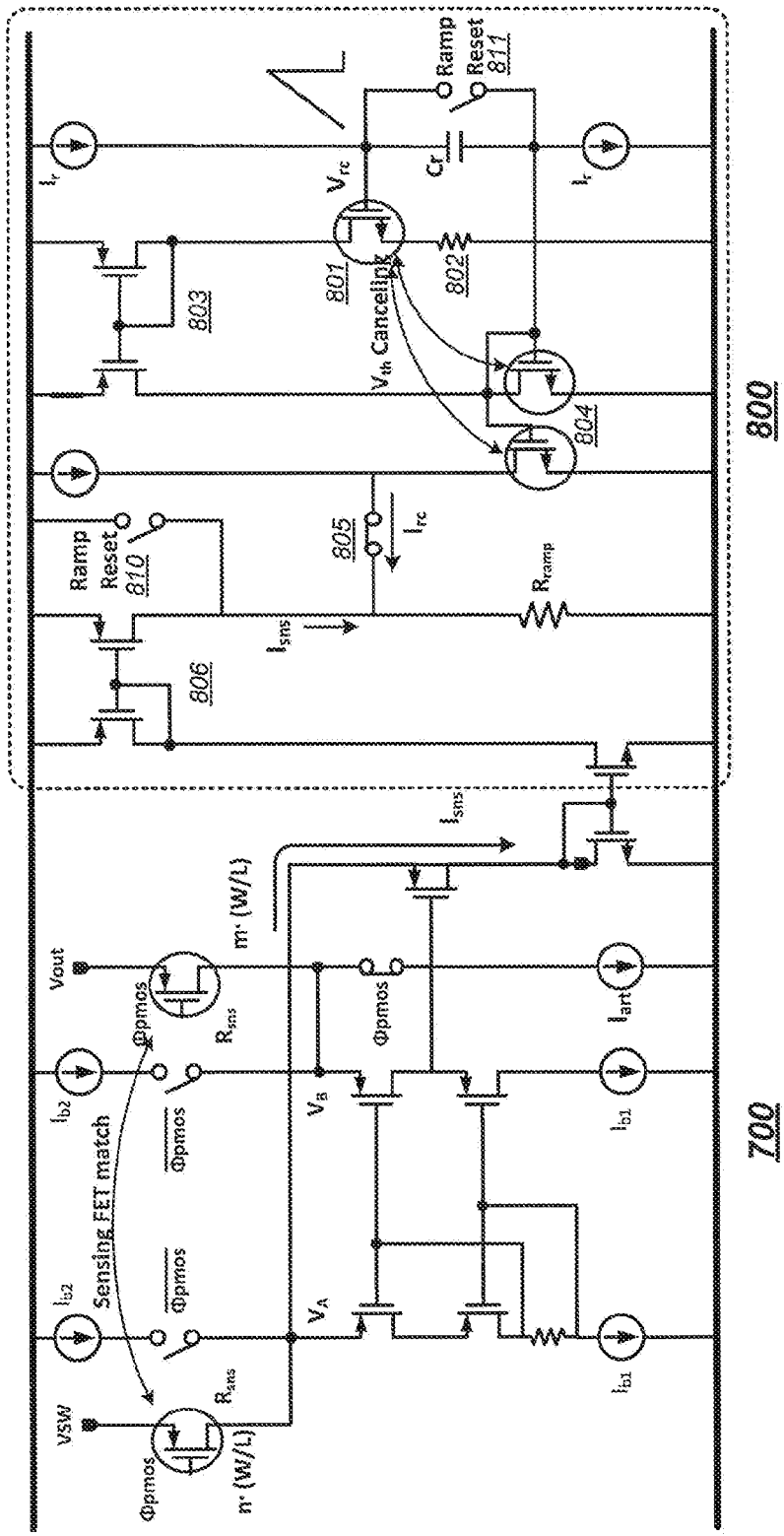
FIG. 8 illustrates an example implementation of current sensing and slope compensated ramp generation according to an embodiment.

FIG. 8 illustrates an example implementation of current sensing and slope compensated ramp generation according to an embodiment. In this example, slope compensation and ramp generation is implemented by combining the sensed inductor current, Isns, and a ramp current, Irc, in a ramp resistor Rramp. For instance, a voltage ramp, Vrc, is generated using current source Ir coupled to capacitor Cr. Vrc is coupled to the gate of NMOS transistor 801 to produce Vrc across resistor 802 and generate a ramp current, Irc, through resistor 802. Irc is coupled through current mirror transistors 803 and 804 and through switch 805, where Irc is combined with Isns from current mirror transistors 806. The combined currents Isns and Irc are coupled across Rramp to produce a voltage ramp, for example. The ramp may be reset by closing reset switches 810 and 811 and opening switch 805, for example.

Figure 9:
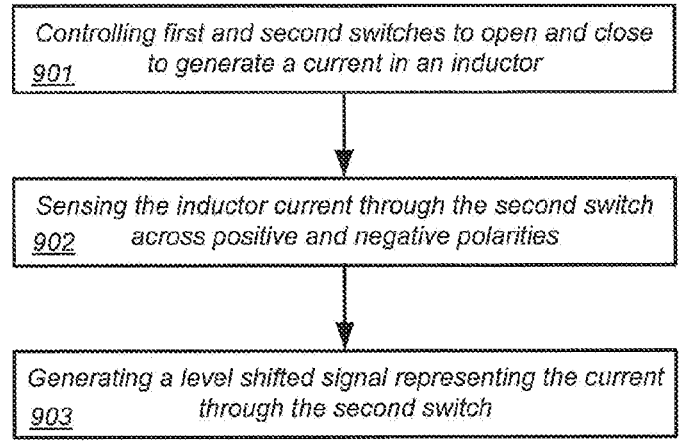
FIG. 9 illustrates method according to an embodiment.

FIG. 9 illustrates method according to an embodiment. In this example, a method of generating a regulated voltage comprises controlling a first switch and a second switch to open and close during a cycle to generate a current in an inductor at 901. The inductor receives a first voltage on a first terminal, where the first switch has a first terminal coupled to a second terminal of the inductor and a second terminal coupled to a reference voltage (e.g., ground). The second switch has a first terminal coupled to the second terminal of the inductor and a second terminal having an second voltage greater than the first voltage, for example. The first switch and the second switch are opened and closed based on the second voltage and the current. At 902, current is sensed through the second switch when the second switch is closed. The current through the second switch may transition from a positive polarity to a negative polarity over the cycle. At 903, a level shifted signal representing the current through the second switch is generated based on sensed current. A polarity of the level shifted signal may be positive over the cycle of the current through the second switch, for example. In one embodiment, sensing the current comprises generating an offset so that a sensed voltage corresponding to a voltage across the second switch remains positive when the voltage across the second switch transitions from positive to negative. In one embodiment, the level shifted signal comprises a maximum positive value corresponding to a maximum positive inductor current and a minimum positive value corresponding to a maximum negative inductor current.

Figure 10:
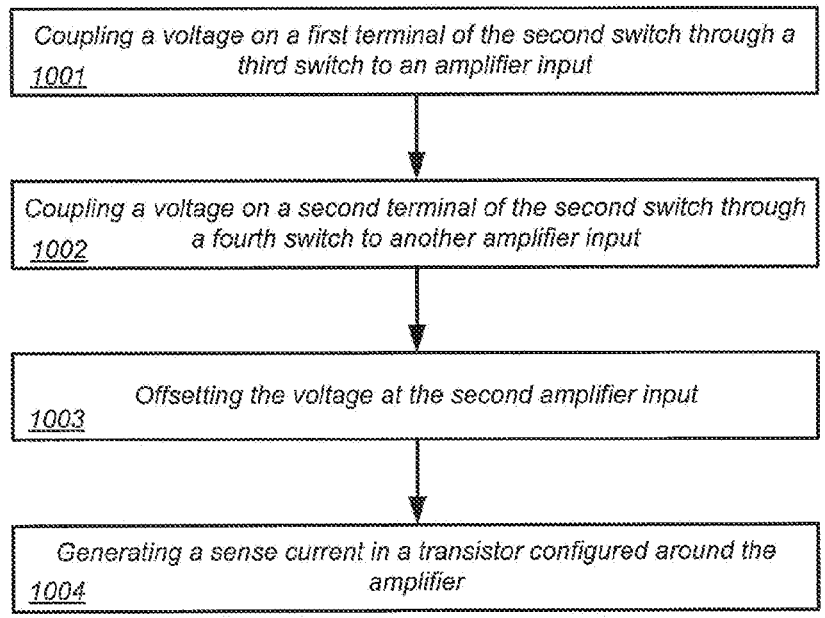
FIG. 10 illustrates method according to another embodiment.

FIG. 10 illustrates method according to another embodiment. In some embodiments, a method of generating a regulated voltage may include, at 1001, coupling a voltage on the first terminal of the second switch through a third switch to a first input of an amplifier, and at 1002, coupling a voltage on the second terminal of the second switch through a fourth switch to a second input of the amplifier. For example, when the second switch is closed, the first switch is open and the third switch and the fourth switch are closed. At 1003, the voltage at the second input of the amplifier may be offset, for example. At 1004, a sensed current in a transistor may be generated, where the transistor has a control terminal coupled to an output of the amplifier, a first terminal coupled to the first input of the amplifier, and a second terminal to produce the sensed current. The sensed current may correspond to the inductor current through the second switch.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A boost switching regulator circuit comprising:
an inductor having a first terminal configured to receive a first voltage and a second terminal;
a first switch having a first terminal coupled to the second terminal of the inductor and a second terminal coupled to a reference voltage;
a second switch having a first terminal coupled to the second terminal of the inductor and a second terminal coupled to a second voltage greater than the first voltage; and
a control circuit coupled to the second terminal of the second switch and configured to control the first switch and the second switch based on the second voltage and a current, the control circuit comprising a current sense circuit coupled to the first terminal of the second switch and the second terminal of the second switch,
wherein a current through the second switch transitions from a positive polarity to a negative polarity over a cycle, and wherein the current sense circuit is configured to generate a level shifted signal representing the current through the second switch, and wherein a polarity of the level shifted signal is positive over the cycle of the current through the second switch.

2. The circuit of claim 1 wherein the level shifted signal represents the current through the second switch over approximately the entire time the second switch is closed over the cycle.

3. The circuit of claim 1 wherein the current sense circuit comprises an offset circuit, wherein the current sense circuit generates sensed voltages corresponding to voltages on the first and second terminals of the second switch, wherein a difference between the sensed voltages remains positive when a difference between the voltages on the first and second terminals of the second switch transitions from positive to negative.

4. The circuit of claim 1, the current sense circuit comprising:
a third switch coupled between the first terminal of the second switch and a first input of the current sense circuit; and
a fourth switch coupled between the second terminal of the second switch and a second input of the current sense circuit,
wherein when the second switch is closed, the first switch is open and the third switch and the fourth switch are closed.

5. The circuit of claim 4, the current sense circuit further comprising:
an amplifier having a first input coupled to the first terminal of the second switch through the third switch and a second input coupled to the second terminal of the second switch through the fourth switch; and
a voltage offset circuit to produce an offset between second terminal of the second switch and the second input of the amplifier.

6. The circuit of claim 5, the current sense circuit further comprising a transistor having a control terminal coupled to an output of the amplifier, a first terminal coupled to the first input of the amplifier, and a second terminal to produce a current corresponding to the current through the second switch.

7. The circuit of claim 5, wherein the voltage offset circuit comprises a current source coupled to the second input of the amplifier to increase the voltage drop across the fourth switch.

8. The circuit of claim 5, wherein the amplifier is a differential input common base amplifier, and wherein the current sense circuit further comprising a fifth switch in series with a first current source coupled between the first input of the amplifier and a second reference voltage and a sixth switch in series with a second current source coupled between the second input of the amplifier and the second reference voltage, wherein the fifth switch and the sixth switch are open when the second switch is closed, and wherein the fifth switch and the sixth switch are closed when the second switch is opened to maintain a bias on the amplifier input when the second switch is opened.

9. The circuit of claim 1 wherein the first switch and the second switch are opened and closed across a plurality of cycles, wherein when the first switch is open, the second switch is closed, and when the first switch is closed, the second switch is opened.

10. The circuit of claim 1 wherein the first switch and the second switch are transistors.

11. The circuit of claim 10 wherein the first switch is an NMOS transistor and the second switch is a PMOS transistor.

12. The circuit of claim 1 wherein the level shifted signal comprises a maximum positive value corresponding to a maximum positive inductor current and a minimum positive value corresponding to a maximum negative inductor current.

13. A switching regulator circuit comprising:
an inductor;
a first switch having a first terminal and a second terminal;
a second switch having a first terminal and a second terminal, wherein the first terminal of the first switch and the first terminal of the second switch form a switching node, and wherein the inductor is coupled to the switching node; and
a control circuit coupled to the second terminal of the second switch and configured to control the first switch and the second switch based on an output voltage and an inductor current, the control circuit comprising a current sense circuit coupled to the first terminal of the second switch and the second terminal of the second switch,
wherein the inductor current flows through the second switch and transitions from a positive polarity to a negative polarity over a cycle, and wherein the current sense circuit is configured to generate a level shifted signal representing the inductor current through the second switch, and wherein a polarity of the level shifted signal is positive over the cycle of the inductor current through the second switch.

14. The circuit of claim 13 wherein the current sense circuit comprises an offset so that a sensed voltage corresponding to a voltage across the second switch remains positive when the voltage across the second switch transitions from positive to negative.

15. The circuit of claim 13 wherein the level shifted signal comprises a maximum positive value corresponding to a maximum positive inductor current and a minimum positive value corresponding to a maximum negative inductor current.

16. The circuit of claim 13, the current sense circuit comprising:
a third switch coupled between the first terminal of the second switch and a first input of the current sense circuit and a fourth switch coupled between the second terminal of the second switch and a second input of the current sense circuit, wherein when the second switch is closed, the first switch is open and the third switch and the fourth switch are closed;
an amplifier having a first input coupled to the first terminal of the second switch through the third switch and a second input coupled to the second terminal of the second switch through the fourth switch;
a voltage offset circuit to produce an offset between the second terminal of the second switch and the second input of the amplifier; and
a transistor having a control terminal coupled to an output of the amplifier, a first terminal coupled to the first input of the amplifier, and a second terminal to produce a current corresponding to the inductor current through the second switch.

17. A method of generating a regulated voltage comprising:
controlling a first switch and a second switch to open and close during a cycle to generate a current in an inductor, the inductor receiving a first voltage on a first terminal, wherein the first switch has a first terminal coupled to a second terminal of the inductor and a second terminal coupled to a reference voltage, and wherein the second switch has a first terminal coupled to the second terminal of the inductor and a second terminal having an second voltage greater than the first voltage, and wherein the first switch and the second switch are opened and closed based on the second voltage and the current; and
sensing the current through the second switch when the second switch is closed, wherein the current through the second switch transitions from a positive polarity to a negative polarity over the cycle; and
generating, based on the sensing the current, a level shifted signal representing the current through the second switch, and wherein a polarity of the level shifted signal is positive over the cycle of the current through the second switch, wherein sensing the current comprises generating an offset so that a sensed voltage corresponding to a voltage across the second switch remains positive when the voltage across the second switch transitions from positive to negative.

18. The method of claim 17 wherein the level shifted signal comprises a maximum positive value corresponding to a maximum positive inductor current and a minimum positive value corresponding to a maximum negative inductor current.

19. The method of claim 17, further comprising:
- coupling a voltage on the first terminal of the second switch through a third switch to a first input of an amplifier;
- coupling a voltage on the second terminal of the second switch through a fourth switch to a second input of the amplifier, wherein when the second switch is closed, the first switch is open and the third switch and the fourth switch are closed;
- offsetting the voltage at the second input of the amplifier; and
- generating a sensed current in a transistor having a control terminal coupled to an output of the amplifier, a first terminal coupled to the first input of the amplifier, and a second terminal to produce said sensed current, wherein the sensed current corresponds to the inductor current through the second switch.

* * * * *